United States Patent Office 2,710,847
Patented June 14, 1955

2,710,847

ACRYLONITRILE POLYMERS DISSOLVED IN DIMETHYL METHANEPHOSPHONATE

George E. Ham, Decatur, Ala., assignor to The Chemstrand Corporation, Decatur, Ala., a corporation of Delaware No Drawing. Application October 7, 1953, Serial No. 384,793

7 Claims. (Cl. 260—30.6)

This invention relates to a new method of preparing synthetic fibers from polymers of acrylonitrile. More particularly the invention relates to a new low-boiling solvent for acrylonitrile polymers, and to completely miscible mixtures including acrylonitrile polymers, from which mixtures, quality fibers can be extruded.

It is well-known that polymers of over 75 percent acrylonitrile are capable of being fabricated into high-strength fibers. The conventional technique for preparing fibers from these polymers involves the dissolution of the polymer in a suitable solvent and thereafter extruding the viscous solution so prepared through an orifice into a medium which removes the solvent and precipitates the acrylonitrile polymer in a continuous form. Many solvents have been proposed but many of them are impracticable due to the excessive cost and due to the tendency of the solutions to gel upon cooling.

The primary purpose of this invention is to provide a new low cost solvent for the preparation of synthetic fibers. A further purpose of this invention is to provide a solvent which forms more stable mixtures or solutions of acrylonitrile polymers. A still further purpose of the invention is to provide a method of forming fibers of high tensile strength and desirable elongation.

It has been found the dimethyl menthanephosphonate is an excellent solvent for polymers at 70 percent or more of acrylonitrile and up to 30 percent of other polymerizable monomers. For the preparation of general purpose fibers, this invention is particularly useful with polymers of acrylonitrile containing at least 85 percent acrylonitrile and up to 15 percent of another polymerizable monomer. The other monomer in the acrylonitrile copolymers may be vinyl acetate and other vinyl esters of monocarboxylic acids, methyl methacrylate and other alkyl esters of methacrylic acid, ethyl acrylate and other alkyl esters of acrylic acid, methacrylonitrile, vinylidene chloride, ethyl maleate and other alkyl esters of maleic acid, ethyl fumarate and other alkyl esters of fumaric acid, styrene and other vinyl substituted aromatic compounds, α-methylstyrene and other isopropenyl aromatic hydrocarbons; vinyl chloride and other vinyl halides, 2-vinylpyridine, 2-methyl-5-vinylpyridine, and other vinyl substituted heterocyclic amines, and other polymerizable monomers capable of copolymerization with acrylonitrile.

The dimethyl methanephosphonate is also useful as a solvent for processing fibers from blended compositions. Since many acrylonitrile polymers are not dyeable by conventional dyeing procedures, it has been proposed to blend them with polymers capable of reacting chemically with dyestuff, whereby the mixed compositions acquire dyeability such that the fibers have general purpose utility. Suitable blending agents are the polymeric compositions of polymerizable monomers containing tertiary amino radicals or other radicals capable of being converted into tertiary amino groups subsequently to the polymerization. Thus copolymers of vinylpyridines, for example 2-vinylpyridine, the alkyl vinylpyridines, for example 2-methyl-5-vinylpyridine, the various vinylquinolines and alkyl substituted vinylquinolines, the various vinylpyrazines and alkyl substituted vinylpyrazines, the various vinyloxazoles and imidazoles including N-vinylimidazoles, and the vinylbenzimidazoles are useful. Similarly related allyl and methallyl derivatives of the above compounds are useful. The vinyl, allyl, and methallyl haloacetates can be reacted with secondary amines either before or after polymerization, and the polymers formed thereof blended with nondyeable acrylonitrile polymers to develop dye affinity. These dyeable blending polymers may be homopolymers or they may be copolymers with any monomer polymerizable therewith, for example, acrylonitrile, styrene, butadiene, vinyl chloride, vinylidene chloride and vinyl acetate. In blending the polymers a substantial proportion of the fiber forming acrylonitrile polymer, for example 80 percent to 98 percent, should be used, depending upon the extent of dye receptivity desired and upon the proportion and relative effectiveness of the reactive monomer present. For example, a suitable blending polymer is one containing 10 to 70 percent by weight of acrylonitrile and 30 to 90 percent by weight of a vinylpyridine or an alkyl-substituted vinylpyridine. Suitable blends or blended compositions are those containing at least 75 percent by weight of acrylonitrile based on the total polymerized monomers in the blend. In general, from two to ten percent of the total of all polymerized monomers present should be the reactive component.

Dimethyl methanephosphonate has the formula:

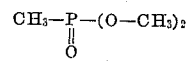

and has a boiling point of about 148° C. All acrylonitrile polymeric materials described above, both polymers and blends, are completely soluble in dimethyl methanephosphonate at 120° C., and solutions prepared by so heating the mixture of polymeric material and solvent are stable at room temperatures to give fluid, colorless solutions completely free of gel formations. Dimethyl methanephosphonate has excellent thermal stability and a high degree of resistance to hydrolysis even after prolonged heating.

In the practice of this invention, as it is in the preparation of all acrylonitrile fibers, the molecular weight of the polymer is of critical importance. The polymer should have a molecular weight in excess of 10,000 and preferably in excess of 25,000. These molecular weights are determined by measuring the viscosity of the polymer when dissolved in a suitable solvent, such as dimethylformamide, in the manner well-known to the art. It is also very desirable to use acrylonitrile copolymers which are substantially uniform throughout with respect to the chemical composition and physical structure. Such uniform copolymers enable the practice of the invention more economically, permitting the utilization of continuous uninterrupted spinning and greatly minimizing fiber fractures and clogging of the spinnerets.

In the practice of this invention the polymers of acrylonitrile are used in finely divided form. Although massive polymers may be ground to desired particle size, preferably solvent-non-solvent polymerization procedures are employed in the preparation of the polymer. The subdivided states of the polymers obtained by spray drying the emulsions or by filtration and subsequent drying of the solid polymers enable them to be used directly. The finely divided polymer is mixed with dimethyl methanephosphonate in any type of mixing device, such as a dough mixer or a homengenizer. It is desirable to use a solution of as high a concentration of the polymer as possible, but the maximum concentration is dependent upon the molecular weight of the polymer.

To obtain fibers of optimum physical properties, polymers of molecular weights in excess of 25,000 are used, and when using such polymers it is only possible to dissolve from five to 35 percent in the dimethyl methanephosphonate without exceeding practicable viscosity values. Although as low as five percent of the polymer can be used in spinning operations, such concentrations are undesirable because they necessitate the removal and recovery of two much solvent from the extruded solution, thereby increasing solvent recovery cost and reducing spinning speeds by reason of the longer periods required for coagulation. The concentration of the polymer in the solution is preferably between seven and 25 percent but will ultimately be determined by considering the desired physical properties of the fiber and the speed of spinning, which speed is a function of the concentration and viscosity of the polymer solution. The viscosity will depend upon the chemical composition and the molecular weight of the polymers. The optimum proportions can best be determined by selecting a uniform molecular weight polymer having good fiber forming properties and dissolving it in the smallest amount of the dimethyl methanephosphonate necessary to form a viscous solution capable of extrusion at convenient temperatures.

The fibers are spun by extruding the dimethyl methanephosphonate solution of the acrylonitrile polymer through an orifice, or a spinneret having a plurality of orifices, into a medium which removes the solvent. The volume of the solution passed through the spinneret per unit of time must be constant in order to produce a fiber of uniform size. This is best achieved by using a positively driven gear pump constructed of corrosion-resistant metals, such as stainless steel, and adapted to deliver a constant flow of solution regardless of minor changes in viscosity and regardless of the resistance offered by the spinneret. It is also desirable to pass the solution through one or more filters before reaching the spinneret in order to remove all possible traces of foreign matter and particles of incompletely dissolved polymer. The polymer solution may be delivered to the gear pump by means of pressure applied by an inert gas to the liquid surface of the solution reservoir, which must be heated to maintain the solution fluid enough to pass through the conduits. The gear pump, filter devices and conduits to the spinneret are preferably heat insulated and may be heated to maintain a fluid solution. The extruding operation should be conducted at elevated temperatures, but far enough below the boiling point of the solvent to prevent bubbles or other irregularities in the fiber.

The medium into which the solution is extruded and which removes the solvent may be either liquid or gaseous. The method involving the use of liquids is known as "wet spinning"; and any liquid which is a non-solvent for the acrylonitrile polymer, but which either dissolves the dimethyl methanephosphonate, or converts it into soluble compounds, may be used. The solvent is leached out of the stream of polymer solution, which first becomes a viscous stream and finally a solid filament. When a spinneret with a plurality of apertures is used the several streams of polymer converge and ultimately form a single fiber. The spin bath must necessarily be of sufficient size to permit the complete, or substantially complete, removal of the dimethyl methanephosphonate. Obviously, the rapidity of extrusion will affect the size of the spin bath, high speeds requiring much longer baths. The temperatures of the bath also affect the size, higher temperatures permitting more rapid diffusion of the dimethyl methanephosphonate from the fiber and enabling the use of shorter baths.

The use of dimethyl methanephosphonate as a solvent for acrylonitrile copolymer is especially adapted to "dry spinning" operations, wherein air, steam, nitrogen or other gas, or mixtures of gases which are inert, at the spin temperature, are used to remove the solvent. This method operates at higher temperatures; and the dimethyl methanephosphonate is evaporated from the surface of the fiber. The maximum temperature to which the fibers can be subjected is usually the boiling point of the dimethyl methanephosphonate, but higher temperatures may be attained by subjecting the operation to pressures higher than normal atmospheric pressure. The fiber may be heated by convection from the hot gases medium or by radiation from the walls of the spinning cell. Generally, a combination of both convection and radiation is involved, but methods involving principally radiation are generally more efficient and permit the operation with the wall temperature considerably in excess of the boiling point of the dimethyl methanephosphonate. The evaporation of the dimethyl methanephosphonate from the fiber surface and the speed of the fiber prevent the development of a temperature exceeding that at which the fiber is stable to decomposition. The dry spinning method is particularly useful at high rates of extrusion.

In general, the methods of both wet and dry spinning commercially used are adaptable for spinning from dimethyl methanephosphonate solutions, but special considerations may be involved due to the different chemical nature of dimethyl methanephosphonate. Automatic machinery for spinning continuously, drying the thread if necessary, and winding it on suitable spools may be modified with the teaching of this specification. As in the case of most synthetic fibers, the fibers of acrylonitrile copolymers spun from dimethyl methanephosphonate solutions may be stretched to develop optimum physical properties. If desired, part of the necessary stretching may be accomplished in the spinning medium by drawing the fiber out of the bath at a rate more rapid than the rate of extrusion.

The following examples in which parts, proportions and percentages are by weight illustrate further the applications of the principles of the invention.

*Example I*

A mixture of one part of polyacrylonitrile and six parts of dimethyl methanephosphonate was heated to 120° C. at which temperature solution occurred. The solution was stable on cooling and almost colorless. The solution precipitated readily in water to yield fibers and films.

*Example II*

One part of a finely divided copolymer of 97 percent acrylonitrile and three percent vinyl acetate was suspended in nine parts of dimethyl methanephosphonate. By heating to about 120° C. with stirring, a clear colorless solution resulted which was stable and gel free at room temperature. Storage for prolonged periods did not lead to viscosity increase or color build-up. Fibers of good strength were prepared by precipitating in air or water. Clear and colorless films were prepared by casting on a smooth surface and evaporating the dimethyl methanephosphonate.

*Example III*

A mixture of one part of a blend of 88 percent of a copolymer of 97 percent acrylonitrile and three percent of vinyl acetate and 12 percent of a copolymer of 50 percent acrylonitrile and 50 percent 2-methyl-5-vinyl-pyridine and 9 parts dimethyl methanephosphonate was heated to 100° C. to effect solution. A clear solution resulted which was stable on cooling. The solution was readily precipitated in water to yield fibers and films.

*Example IV*

One part of a blend of 88 percent of a copolymer of 94 percent acrylonitrile and 6 percent vinyl acetate and 12 parts of a copolymer of 50% acrylonitrile and 50%

2-methyl-5-vinylpyridine was mixed with 20 parts of diethyl methanephosphonate and heated with agitation at 80° C. for six hours. No visible swelling or solution of polymer occured. Continued heating at the boiling point of the solvent for twenty minutes failed to produce solution.

*Example V*

The conditions of Example IV were repeated with a polymer of 94% acrylonitrile and vinyl acetate. Similar results were obtained.

*Example VI*

The conditions of Example IV and V were repeated with diisopropyl methanephosphonate as solvent, and similar results were obtained in that no solution occurred.

I claim:

1. A new composition of matter comprising a homogeneous miscible mixture of from 65 to 95 percent by weight of dimethyl methanephosphonate and from five to 35 percent of a polymer of at least about 70 percent of acrylonitrile and up to about 30 percent of another copolymerizable monomer.

2. A new composition of matter comprising a homogeneous miscible mixture of from 65 to 95 percent by weight of dimethyl methanephosphonate and from five to 35 percent of a copolymer of at least about 70 percent of acrylonitrile and up to about 30 percent of vinyl acetate.

3. A new composition of matter comprising a homogeneous miscible mixture of from 65 to 95 percent by weight of dimethyl methanephosphonate and from five to 35 percent of a copolymer of at least about 70 percent of acrylonitrile and up to about 30 percent of a vinylpyridine.

4. A new composition comprising a homogeneous miscible mixture of from 65 to 95 percent by weight of dimethyl methanephosphonate and from five to 35 percent of polyacrylonitrile.

5. A new composition of matter comprising a homogeneous miscible mixture of from 65 to 95 percent by weight of dimethyl methanephosphonate and from five to 35 percent of a blend of (A) a copolymer of at least 75 percent acrylonitrile and up to 25 percent of another copolymerizable monomer and (B) a copolymer of from 30 to 90 percent of a compound of the group consisting of vinylpyridines and alkyl substituted vinylpyridines and from ten to 70 percent of another copolymerizable monomer.

6. A new composition of matter comprising a homogeneous miscible mixture of from 65 to 95 percent by weight of dimethyl methanephosphonate and from five to 35 percent of a blend of (A) a copolymer of at least 85 percent of acrylonitrile and up to 15 percent of another polymerizable monomer and (B) a copolymer of from 30 to 90 percent of a compound of the group consisting of vinylpyridines and alkyl substituted vinylpyridines and from ten to 70 percent of acrylonitrile.

7. A new composition of matter comprising a homogeneous miscible mixture of from 65 to 95 percent by weight of dimethyl methanephosphonate and from five to 35 percent of a blend of (A) a copolymer of at least 75 percent acrylonitrile and up to 25 percent of vinyl acetate and (B) a copolymer of from ten to 70 percent by weight of acrylonitrile and from 30 to 90 percent of a compound of the group consisting of the vinylpyridines and the alkyl substituted vinylpyridines.

No references cited.